US012789739B2

(12) United States Patent
Mätz et al.

(10) Patent No.: US 12,789,739 B2
(45) Date of Patent: Nov. 10, 2026

(54) VEHICLE SEAT MEMBER

(71) Applicant: Ford Global Technologies, LLC, Dearborn, MI (US)

(72) Inventors: Fabian Mätz, Much (DE); Christoph Küpper, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/268,138

(22) Filed: Jul. 14, 2025

(65) Prior Publication Data

US 2026/0014953 A1 Jan. 15, 2026

(30) Foreign Application Priority Data

Jul. 15, 2024 (DE) ......................... 102024120037.5

(51) Int. Cl.

| | |
|---|---|
| ***B60N 2/58*** | (2006.01) |
| ***B60R 21/16*** | (2006.01) |
| ***B60R 21/207*** | (2006.01) |
| ***B60R 21/2342*** | (2011.01) |
| ***B60R 21/26*** | (2011.01) |

(52) U.S. Cl.

CPC ...... *B60R 21/207* (2013.01); *B60R 2021/161* (2013.01)

(58) Field of Classification Search

CPC ......... B60R 21/02; B60R 21/16; B60R 21/20; B60R 2021/161; B60R 2021/207; B60R 2021/2076

USPC ....................................................... 280/728.1

See application file for complete search history.

(56) References Cited

U.S. PATENT DOCUMENTS

| | | | | |
|---|---|---|---|---|
| 7,543,847 B2 * | 6/2009 | Tracht | B60R 21/207 | 280/730.2 |
| 7,690,723 B2 * | 4/2010 | Evans | B60N 2/58 | 297/216.13 |
| 10,207,668 B2 * | 2/2019 | Goto | B60R 21/207 | |
| 10,464,518 B2 * | 11/2019 | Patel | B60R 21/231 | |
| 2008/0224454 A1 * | 9/2008 | Tracht | B60R 21/207 | 280/728.3 |
| 2011/0309604 A1 * | 12/2011 | Moore | B60R 21/207 | 280/730.2 |

(Continued)

FOREIGN PATENT DOCUMENTS

| | | | |
|---|---|---|---|
| CN | 101618704 A * | 1/2010 | B60R 21/207 |
| CN | 101786442 A * | 7/2010 | B60R 21/201 |

(Continued)

OTHER PUBLICATIONS

DE Search Report dated Mar. 24, 2025 (Machine Translation and Original Version).

*Primary Examiner* — Daniel M. Keck
(74) *Attorney, Agent, or Firm* — Frank A. MacKenzie; Brooks Kushman P.C.

(57) ABSTRACT

A vehicle seat member has a cover having a tear seam, an airbag module having an airbag, and a force concentrator that is arranged at least partially inside the cover for directing an expansion force of the airbag onto the tear seam, having at least one seam connection region, which is connected to the cover at one side of the tear seam. The force concentrator has an identification label that is connected to at least one seam connection region and that protrudes at the outer side of the tear seam beyond the cover.

7 Claims, 2 Drawing Sheets

(56) References Cited

U.S. PATENT DOCUMENTS

| | | | | |
|---|---|---|---|---|
| 2012/0038131 | A1* | 2/2012 | Muller | B60R 21/201<br>29/428 |
| 2012/0139218 | A1* | 6/2012 | Gumprecht | B60R 21/207<br>280/730.2 |
| 2015/0076802 | A1* | 3/2015 | Tanabe | B60R 21/207<br>280/730.2 |
| 2017/0327072 | A1* | 11/2017 | Severinski | B60R 21/2165 |

FOREIGN PATENT DOCUMENTS

| | | | | |
|---|---|---|---|---|
| CN | 101857004 | A * | 10/2010 | B60R 21/207 |
| DE | 102005037044 | A1 * | 2/2007 | B60R 21/207 |
| DE | 102009004882 | A1 | 7/2010 | |
| DE | 102009042308 | A1 * | 3/2011 | B60R 21/207 |
| DE | 102011105458 | A1 * | 12/2012 | B60R 21/207 |
| DE | 102011105461 | A1 * | 12/2012 | B60R 21/207 |
| DE | 102013200075 | A1 * | 7/2014 | B60R 21/207 |
| DE | 102016203205 | A1 * | 8/2017 | B60R 21/207 |
| DE | 102017202256 | A1 * | 8/2017 | B60R 21/207 |
| DE | 102016106342 | A1 * | 10/2017 | B60R 21/207 |
| FR | 2919838 | A1 * | 2/2009 | B60R 21/207 |

* cited by examiner

VEHICLE SEAT MEMBER

CROSS-REFERENCE TO RELATED APPLICATION

The present application claims priority to, and all the benefits of, German Patent Application DE102024120037.5 filed Jul. 15, 2024, which is hereby incorporated by reference in its entirety.

FIELD OF THE INVENTION

The disclosure relates to a vehicle seat member, in particular for a motor vehicle.

BACKGROUND

Airbags are included in modern motor vehicles as standard retention systems. Airbags typically involve a plastics material bag which is connected to a gas generator which serves to inflate the airbag. The gas generator is activated in response to sensors. The gas generator may be, for example, pyrotechnic gas generators, cold gas generators, or hybrid gas generators. In addition to front airbags which are accommodated in the steering wheel or in the instrument panel in front of the driver or passenger, some vehicles are also provided with side airbags that are deployed between the door trim and seat. The side airbag is concealed below the cover of the backrest that also covers the seat cushion.

During inflation of the airbag, there is provision for the airbag to penetrate through a tear seam of the cover and to deploy outward. The tear seam connects two portions of the cover and is configured in terms of its stability to tear as intended when the airbag deploys. A basic problem is that the tear seam is located in a spatially relatively tightly confined region with respect to the airbag whilst the airbag tries to expand in all directions.

In order to counteract this, force concentrators may be used in order to direct the expansion of the airbag in the direction of the tear seam or to concentrate the expansion force onto the tear seam. Such force concentrators normally include a material which has a lesser ability to expand and which acts counter to the forces which occur during the expansion of the airbag. The force concentrator is opened in the direction toward the tear seam.

In many countries, it is mandatory to characterize an airbag which is integrated in the seat by means of a sign which has to be readily visible from the outer side. The corresponding sign is typically sewn to the cover or connected thereto in another manner.

SUMMARY OF THE DISCLOSURE

It should be noted that in the following description features and measures set out individually can be combined with each other in any technically advantageous manner and set out other embodiments of the disclosure. The description further specifies the disclosure in particular in connection with the Figures.

A vehicle seat member, in particular for a motor vehicle such as a lorry or a passenger vehicle, is provided. The vehicle seat member forms in this instance at least a portion of a vehicle seat, for example, a lower seat portion or a backrest. The vehicle seat member has a cover having a tear seam, an airbag module having an airbag, and a force concentrator which is arranged at least partially inside the cover for directing an expansion force of the airbag onto the tear seam. The cover, which can also be referred to as a coating, shell, or trim of the seat member, forms at least a portion of the actual surface of the vehicle seat. The cover includes a layered, flexible material, for example, fabric, leather, synthetic leather or the like. Configurations are also expressly possible in which the cover includes a plurality of layers or in which a layer includes different materials in places. The cover has a tear seam that can also be referred to as a desired tear seam. This seam is provided to tear as intended when the airbag is activated and thus to release a through-opening for the airbag. The term “seam” is not intended to be interpreted to be limiting in that in this instance it must be a sewn connection, but instead in this instance theoretically a connection which is produced in another manner, for example, adhesively bonded or welded, could also be produced between two portions or parts of the cover and is structurally weakened in comparison with the adjacent material so that the tear seam tears as intended with a corresponding loading.

Of course, the cover at least partially surrounds the airbag module or the cover is arranged inside the cover or—with respect to a viewing side—behind the cover. Of course, the vehicle seat member for reasons of comfort generally also includes cushion members that are arranged inside the cover, for example, made of foamed plastics material. In addition, sensors, heating elements, or other components may also be arranged below the cover.

The airbag module may include, for example, a gas generator and/or an airbag shell that is used only to pack the folded-up airbag and gives way without significant resistance during actuation. Alternatively, the gas generator could be arranged with a degree of spacing from the airbag or even outside the seat member and connected thereto by a connection line. However, the gas generator normally more or less directly adjoins the airbag. It may in particular be in the form of a pyrotechnic gas generator or a hybrid gas generator in which gas is released in a pyrotechnic manner from a pressure container. The airbag is in known manner in the form of a flexible, tear-resistant bag and may include a plastics material sheeting or a textile material, for example, a woven fabric that may be coated with a film.

The force concentrator, which may also be referred to as an expansion force concentrator, expansion direction element, or the like, serves to direct the force or the pressure which the airbag develops when the airbag is inflated and during the related expansion in the direction toward the tear seam. It could also be said that the function of the force concentrator involves concentrating this force in the region of the tear seam or directing the expansion of the air bag in the direction toward the tear seam. In particular, the force concentrator may limit the expansion movement of the airbag in at least one direction and/or in at least one region, which leads to the airbag having to expand in another direction. The force concentrator is at least partially arranged inside the cover, that is to say at the same side as the airbag. The force concentrator, which generally includes comparatively inflexible material, may partially surround the airbag and/or be arranged at least partially adjacent thereto.

The force concentrator has at least one seam connection region that is connected to the cover at one side of the tear seam. Normally, the tear seam connects two portions of the cover to each other so that the seam connection region is connected to precisely one of the two portions. Generally, the connection is provided in a region which is adjacent to the tear seam. The connection may be configured in a non-positive-locking, positive-locking and/or materially engaging manner. The connection does not have to be gas-tight, but should in any case be stronger than the connection provided by the tear seam. Consequently, it is ensured that, when a force acts on the seam connection region, the seam connection region acts via the connection mentioned on the cover and consequently on the tear seam, wherein, when a specific loading is exceeded, the tear seam tears, whilst the connection between the tear seam connection region and cover ideally remains intact. It could also be said that the cover is torn apart by means of the action of force of the seam connection region of the force concentrator at the tear seam.

The force concentrator has an identification label that is connected to at least one seam connection region and that protrudes at the outer side of the tear seam beyond the cover. The identification label may be used to identify the presence of the airbag. The identification label may be provided with at least one symbol and/or at least one label, for example, the label "airbag." In any case, the identification label protrudes at the outer side of the tear seam beyond the cover. The identification label may be arranged partially or completely at the outer side of the cover, that is to say at the usable side of the cover in the normal state, that is to say at the visible side thereof. The identification label is connected to at least one seam connection region and consequently integrated in the force concentrator. In addition to other possible advantages which will be further discussed below, as a result of the force concentrator two functions are performed. As a result of the arrangement of the identification label on the force concentrator, it can also be ensured that an externally visible notice is arranged at least approximately in the region in which an opening of the cover and a discharge of the airbag from the cover may also be anticipated. In an ideal configuration, the notice which can be seen from the outer side, is arranged precisely at the location at which an opening of the cover and a discharge of the airbag from the cover may be anticipated.

The force connector may be connected beside the seam connection region to at least one other location. Embodiments would be conceivable in which the force concentrator surrounds the airbag in the manner of a cover, for example, in the manner of a bag or a net in which the airbag is arranged. In this instance, two seam connection regions could be connected to the cover at different sides of the tear seam. Another embodiment makes provision for the force concentrator to have at least one frame connection region which is connected to a frame portion of the vehicle seat member. The frame portion belongs to a frame of the vehicle seat member which substantially provides the frame portion with its mechanical stability and, for example, comprises metal, for example steel. The frame portion may also form the frame. The term "frame portion" is not intended to be interpreted in such a manner that it has to be configured in one piece. Instead, the frame portion may include a plurality of individual elements that are connected to each other. The frame portion may, in particular, have at least one shaped sheet metal portion. In the case of a seat backrest, the frame is also used for pivotable connection to a seat face, which in turn is connected to the vehicle base (so as to be able to be adjusted in terms of its position). In the installed state, the frame portion is connected directly or indirectly to the vehicle member and consequently forms a stable base for connecting the force concentrator. The connection is provided by at least one frame connection region. The frame connection region may be connected to the frame portion by a suitable positive-locking, non-positive-locking, and/or materially engaging connection. Normally, the entire airbag module, including the gas generator, is secured to the frame portion. This also includes embodiments in which the airbag is secured indirectly to the frame portion the gas generator. The securing may, for example, be carried out by a screw connection.

According to one embodiment, there is provision for the at least one seam connection region to extend over a maximum of 30%, e.g., a maximum of 20% of the tear seam in some examples and a maximum of 10% of the tear seam in some examples. The connection is accordingly provided over only a small portion of the tear seam. This means that the force concentration can be carried out on a small region so that the tearing-apart of the tear seam is initially carried out only or primarily in this region. There may be provision for the action of the tear seam giving way to have its starting point at that location, but to then continue to the other unconnected portions. As a result of the selective limitation of the force action, the tearing-open may, under some circumstances, be accelerated or facilitated, which in turn has an overall positive effect on the expansion of the airbag. The extent of the at least one seam connection region along the tear seam may approximately correspond to the extent of the identification label. That is to say this may also extend along a maximum of 30%, 20%, or 10% of the tear seam in some examples.

The disclosure can, in principle, be used on all airbag systems that are accommodated in vehicle seats, such as, for example, seat upholstery airbags that are arranged in the seat face. However, the vehicle seat member may be in the form of a seat backrest on which the tear seam is laterally arranged. The term "laterally" in this instance naturally refers to the viewing direction of a passenger on the vehicle seat. Therefore, the airbag is in this instance a side airbag which is provided to deploy between the seat and seat wall or door trim.

Advantageously, the force concentrator is configured to be at least partially flexible. The flexible portion may, for example, include film or textile material or a combination thereof. The textile material may be configured in a strand-like manner as a cord or cable, but the textile material may also be configured in a planar manner, for example, as a woven fabric, knitted fabric, mesh or felt. The textile material is constructed from fibers which may be natural fibers or synthetic fibers. Synthetic fibers in this context also include metal fibers and wires. As a result of the flexible structure, the force concentrator may, for example, be adapted to the shape of the expanding airbag without resulting in excessive, local pressure. It is possible that the force concentrator includes a material that can also be used for an airbag or includes the same material as the airbag. In particular, the force concentrator may be configured to be flexible between at least one seam connection region and at least one frame connection region. The connection regions may, for example, be ends of a web of flexible material which the force concentrator completely or partially comprises.

It would be conceivable in the context of the disclosure for a connection region to be connected via a common connection to the identification label and to the tear seam. However, this would mean that the identification label, tear seam, and seam connection region can only be connected together to each other, which may complicate the production of the vehicle seat member. It is advantageous for at least one seam connection region to be connected to the identification label independently of the tear seam. In this instance, the seam connection region and the identification label form a connected unit which during the production process can be handled in its entirety before connection to the tear seam. If the seam connection region is then connected to the tear seam, the identification label is thereby also necessarily connected to the cushion, that is to say at least indirectly by means of the seam connection region.

The identification label may be separately prefabricated and subsequently connected to the at least one seam connection region. This may afford advantages if, for example, the two elements are intended to have different material properties. On the other hand, it is preferable for at least one seam connection region to be configured integrally with the identification label. In this regard, the identification label could also be referred to as a lug which protrudes over the seam connection region and which as mentioned by way of example may provide information items.

One embodiment makes provision for the force concentrator to expand in the direction away from the identification label toward the at least one frame connection region. On the whole, the force concentrator on the frame portion may extend over a larger region than in the region of the identification label and/or on the tear seam. This may be particularly advantageous with a comparatively small identification label. Whilst on the identification label only a small region can be used for connection, on the frame portion a generally larger region is used. The force concentrator which widens or expands in the direction toward the frame portion may, for example, absorb force components acting in a different direction between the frame portion and tear seam.

One embodiment makes provision for the force concentrator to have a plurality of strands which extend from at least one seam connection region which is connected to the identification label to a plurality of frame connection regions which are connected to the frame portion independently of each other. From the overall structure, the force concentrator branches in the direction toward the frame. The plurality of strands are connected to the identification label by either one or more seam connection regions. That is to say, the identification label forms a common output or connection location for the strands. It is in this instance also possible for a plurality of strands to merge in a single seam connection region and consequently to be configured integrally with each other. However, the strands run to a plurality of frame connection regions. The frame connection regions may be completely separated from each other, that is to say, spaced apart from each other. However, the frame connection regions could also overlap. In any case, the strands are connected to the frame portion independently of each other by the frame connection regions. Consequently, the identification label is connected to the frame portion in a redundant manner by the strands. When the airbag is activated, each of the strands can also apply a tensile force to the tear seam independent of the other ones. Should, for example, the connection of one strand in one of the frame connection regions fail, this would have no direct effect on the other strands. In an example configuration, in the case of a plurality of strands, only one of them may have the identification label.

In particular, at least one spacing between two strands may decrease in the direction toward at least one seam connection region. That is to say, both strands move closer to each other in the direction toward the seam connection region. Consequently, the strands move apart from each other in the direction toward the frame connection regions. The force concentrator consequently spreads out in the direction toward the frame portion. In particular, the strands may extend in a star-like manner from the tear seam, that is to say, from the seam connection region to the frame portion. On the whole, in this embodiment, the strands may be connected to the frame portion by means of a larger region than to the tear seam, which again may be advantageous with a comparatively small identification label. In this instance, in particular different strands may transmit force components in different directions depending on their path.

The connection of a seam connection region to the cover may be carried out in different manners. It could, for example, be produced by adhesive bonding or welding. Advantageously, at least one seam connection region is sewn to the cover. This connection method is advantageous in so far as both the force concentrator and the cover advantageously comprise layered, flexible materials that can be sewn together in a relatively simple manner in technical process terms. Furthermore, a very secure connection that maintains the flexibility of the connected materials and also permits small displacements of the materials with respect to each other can be produced by a seam.

DETAILED DESCRIPTION

Other advantageous details and effects of the disclosure are explained in greater detail below with reference to an exemplary embodiment which is illustrated in the Figures, in which.

Figure 1:
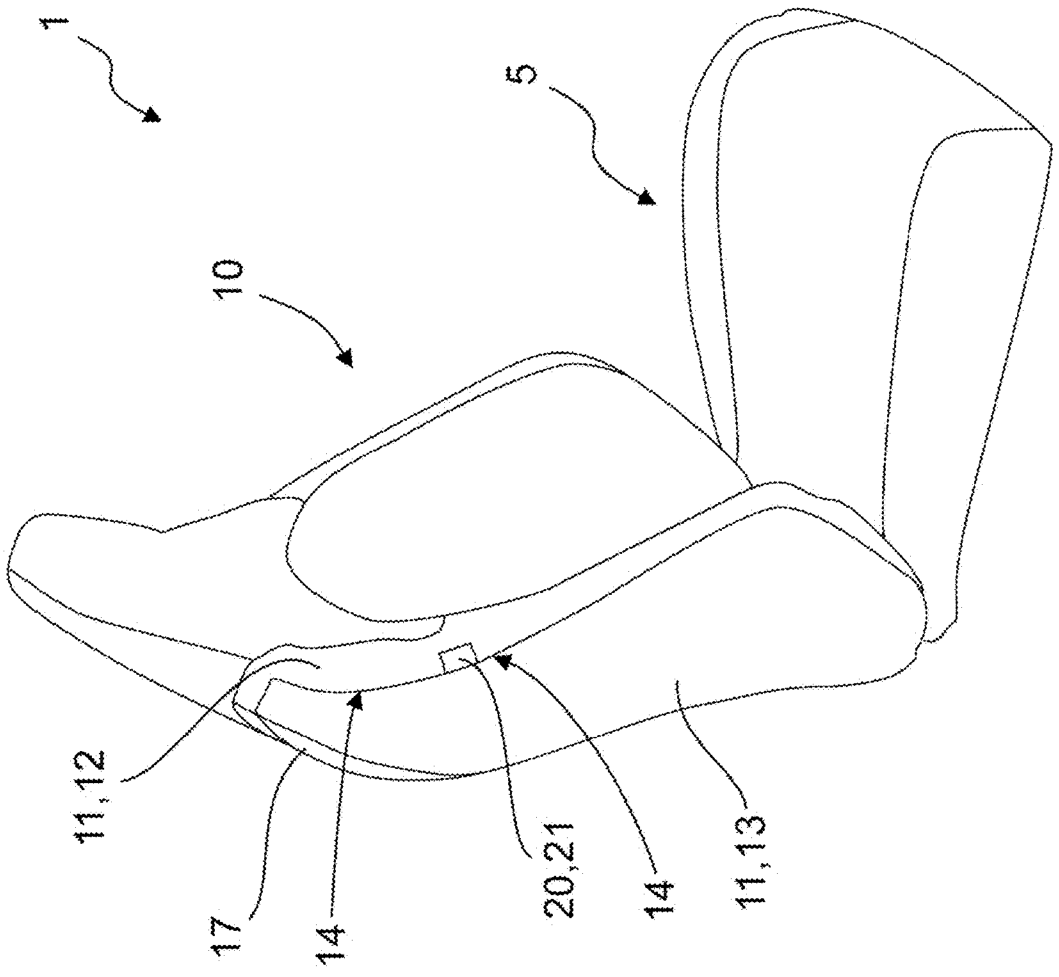
FIG. 1 shows a perspective illustration of a vehicle seat having a seat backrest according to the disclosure.

In the different Figures, the same components are always given the same reference numerals, for which reason they are generally also only described once. The terms “first”, “second”, etc., used here are used only for the purposes of distinction. In particular, as a result of its use, no sequence or priority of the elements mentioned in connection with these terms is intended to be implied.

Figure 3:
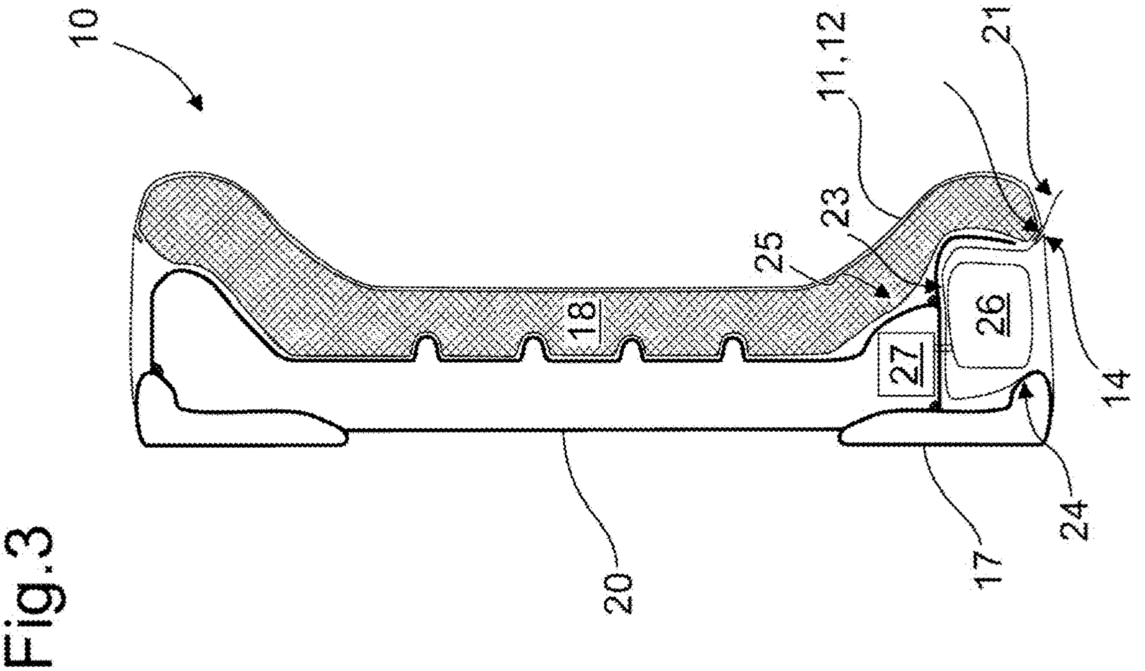
FIG. 3 shows a sectioned illustration according to the line of section III-III in FIG. 2.
Figure 2:
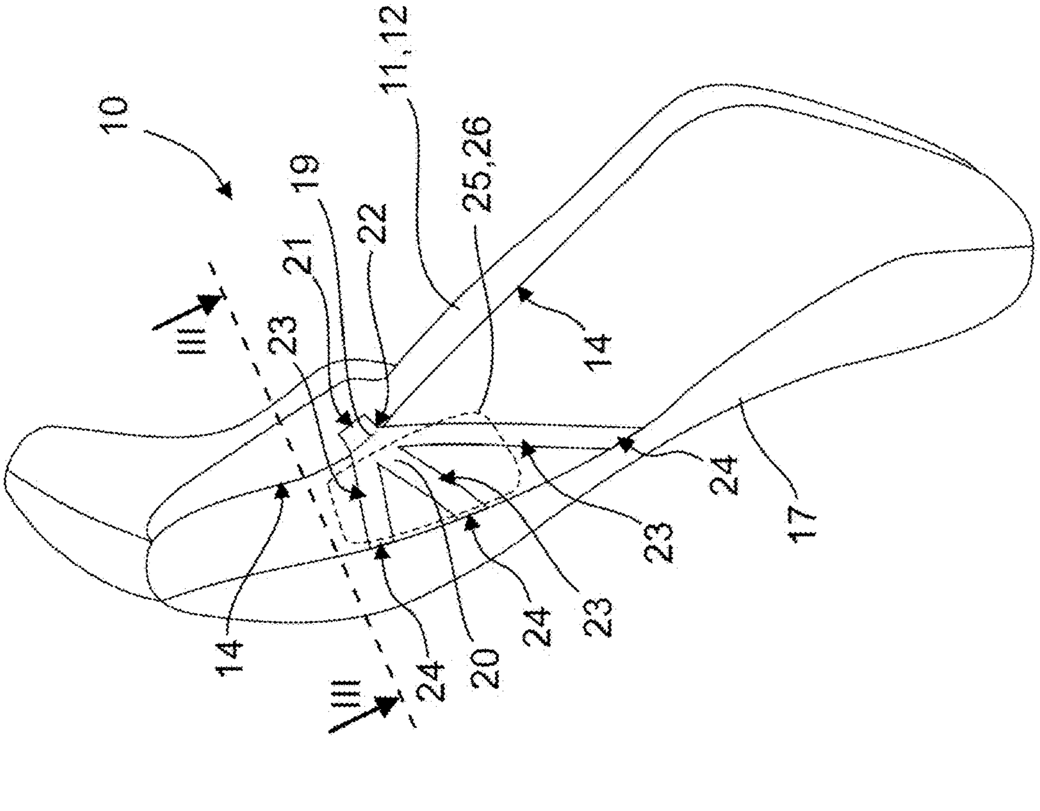
FIG. 2 shows a side view of the seat backrest from FIG. 1.

FIG. 1 shows a vehicle seat 1, for example, for a passenger vehicle or a lorry, having a lower seat portion 5 and a seat backrest 10 that is pivotably connected to the lower seat portion 5 in a manner not illustrated in greater detail. The seat backrest 10 which is illustrated individually in FIGS. 2 and 3 forms in this instance a vehicle seat member according to the disclosure. A cover 11 is secured to a rigid frame portion 17. A cushion member 18 is arranged between the frame portion 17 and cover 11 in order to improve the seat comfort. The cover 11 may be produced in a known manner from flexible textile material, leather, synthetic leather, or the like. The cover 11 includes a first cover portion 12 that forms a lateral region of the front side of the seat backrest 10, and a second cover portion 13 that is adjacent thereto and that is arranged at the side of the seat backrest 10. An airbag 26 of an airbag module 25 is stored below the second cover portion 13. The airbag module 25 is connected to the frame portion 17 and has a gas generator 27. The gas generator 27 is connected to the airbag 26 in such a manner that the gas generator 27 can release gas into the airbag 26 to inflate the airbag 26. In order to enable the deployment of the airbag 26, the cover 11 includes a tear seam 14 between the cover portions. This tear seam 14 connects the cover portions 12, 13 and is provided to tear as intended when the airbag is deployed.

In order to promote the tearing-open action, a force concentrator 20 is provided at a side of the airbag 26 opposite the second cover portion 13, e.g., the inner side of the airbag 26. In order to provide a clearer view of the force concentrator 20 in FIG. 2, the second cover portion 13 is omitted and the airbag 26 is illustrated only with broken lines. The force concentrator 20 is produced from flexible textile material, for example, from a synthetic fiber fabric which is coated with a silicone film. When the airbag 26 is activated, an expansion thereof is limited, that is to say directed, by the force concentrator 20. A force concentration in the direction of the tear seam 14 is thereby produced. More specifically, via a seam connection portion 22 of the force concentrator 20, a heavily localized tension is applied to the tear seam 14. The seam connection portion 22 is sewn to the first cover portion 12 by] a connection seam 19. The seam connection region 22 extends in this example over less than 10% of the tear seam 14.

The force concentrator 20 has an identification label 21 that is configured integrally with the seam connection portion 22. The identification label 21 protrudes through the tear seam 14 and consequently extends outside the cover 11. The identification label 21 may have a label or other identification that indicates the airbag 26. From the seam connection portion 22, three strands 23 of the force concentrator 20 extend toward the frame portion 17. Each strand 23 is connected in a frame connection portion 24 to the frame portion 17. The strands 23 extend in a star-like manner from the seam connection portion 22 so that the force concentrator widens or expands in the direction toward the frame connection portions 24 and a spacing between adjacent strands 23 increases. The strands 23 are in this instance configured integrally with each other and with the identification label 21. However, the strands 23 could also be prefabricated separately and connected to each other and/or to the identification label 21, for example, by sewing. Instead of planar textile material, the strands 23 could also be in the form of cords. When the airbag 26 is activated, the individual strands represent individual connections between the frame portion 17 and a small part-region of the first cover portion 12 in the region of the tear seam. If the second cover portion 13 is pressed outward by the airbag 26, the retention effect promotes a tearing-open action of the tear seam 14 in the region of the seam connection portion.

The invention claimed is:

1. A vehicle seat member comprising:

an airbag module having an airbag;

a cover having a tear seam, the tear seam having an outer side facing away from the airbag;

the airbag module including a force concentrator arranged at least partially inside the cover and being configured to direct an expansion force of the airbag onto the tear seam;

the force concentrator having at least one seam connection region connected to the cover at one side of the tear seam;

the force concentrator having an identification label connected to the at least one seam connection region, the identification label protruding at the outer side of the tear seam beyond the cover;

the force concentrator having frame connection regions connected to a seat frame independently of each other;

the force concentrator having strands that extend from the at least one seam connection region to the frame connection regions; and at least one spacing between two of the strands decreases in the direction toward the at least one seam connection region.

2. The vehicle seat member according to claim 1, wherein the force concentrator is flexible relative to the at least one seam connection region and/or the frame connection regions.

3. The vehicle seat member according to claim 1, wherein the at least one seam connection region extends along less than 10% of a length of the tear seam.

4. The vehicle seat member according to claim 1, wherein the at least one seam connection region is connected to the identification label independently of the tear seam.

5. The vehicle seat member according to claim 1, wherein the at least one seam connection region is integral with the identification label.

6. The vehicle seat member according to claim 1, wherein the force concentrator expands in the direction away from the identification label toward the frame connection regions.

7. The vehicle seat member according to claim 1, wherein the at least one seam connection region is sewn to the cover.

* * * * *